US 12,449,070 B1

(12) United States Patent
Davis et al.

(10) Patent No.: US 12,449,070 B1
(45) Date of Patent: Oct. 21, 2025

(54) RESTRAINED WIDE RANGE COUPLING SYSTEM

(71) Applicant: Sensus Spectrum, LLC, Morrisville, NC (US)

(72) Inventors: Isaac Davis, Ashdown, AR (US); Sean Withem, Texarkana, AR (US)

(73) Assignee: Sensus Spectrum, LLC, Morrisville, NC (US)

( * ) Notice: Subject to any disclaimer, the term of this patent is extended or adjusted under 35 U.S.C. 154(b) by 0 days.

(21) Appl. No.: 18/629,020

(22) Filed: Apr. 8, 2024

(51) Int. Cl.
    *F16L 21/06* (2006.01)
    *F16L 21/03* (2006.01)

(52) U.S. Cl.
    CPC .............. *F16L 21/065* (2013.01); *F16L 21/03* (2013.01)

(58) Field of Classification Search
    CPC ....... F16L 21/065; F16L 21/03; F16L 21/007; F16L 21/022; F16L 23/08; F16L 17/04; F16L 25/14; F16L 25/12; F16L 27/00; F16L 47/08; F16L 47/10
    See application file for complete search history.

(56) References Cited

U.S. PATENT DOCUMENTS

| | | |
|---|---|---|
| 8,894,100 B2 | 11/2014 | Eaton et al. |
| 9,212,768 B2 | 12/2015 | Chiproot |
| 9,534,714 B2 | 1/2017 | Eaton et al. |
| 9,915,385 B2 | 3/2018 | Eaton et al. |
| 2019/0086006 A1* | 3/2019 | Nam ........................ F16L 17/06 |
| 2023/0167929 A1* | 6/2023 | Piontek ................... F16J 15/104 |
| | | 285/364 |

OTHER PUBLICATIONS

Alpha Coupling, 4-12 Inch Standard, Romac Industries, Inc., 2021, 1 page.
Alpha Restrained Joint Extended Range Coupling—Submitted Information, Romac Industries, Inc., 2020, 1 page.
Alpha Restrained Joint, Romac Industries, Inc., 2022, 11 pages.
Alpha Restrained Couplings and Flange Coupling Adapters—Sample Specification, Romac Industries, Inc., 2022, 1 page.
Hymax Grip Coupling Restraint (1.5"-12"), Mueller, 2021, 4 pages.
Hymax Grip Wide-Range Restraint Solutions, Krausz, 2021, 4 pages.
Robar 1691 Two Bolt Coupling—Submittal Information, Robar Industries Ltd., Jan. 1, 2024, 1 page.
Robar 1696-2B Coupling, Robar Industries, Inc., Mar. 1, 2023, 1 page.
Alpha Restrained Joint, Romac Industries, Inc., Jul. 28, 2021, 12 pages.

(Continued)

*Primary Examiner* — Aaron M Dunwoody
(74) *Attorney, Agent, or Firm* — Stanek Lemon Crouse & Meeks, PA (57) ABSTRACT

A pipe fitting is provided including a sleeve having a generally cylindrical body portion with at least one open end configured to receive at least one pipe; a sealing gasket operatively coupled with the sleeve for engaging at least one pipe end of the at least one pipe; and a clamping element operatively coupled with the sleeve for compressing the sealing gasket into tightened engagement with the at least one of the pipe end. The clamping element further includes one or more flanges and the one or more flanges have at least one notch therein on an internal surface thereof.

21 Claims, 8 Drawing Sheets

(56) References Cited

OTHER PUBLICATIONS

Hymax Grip 4"-12", SD890-56-01, Product Information, Krausz, 2014, 1 page.
Hymax Grip Small 1.5"-3", SD890-56-02, Product Information, Krausz, 2015, 1 page.
Hymax Grip 14-16", SD890-56-05, Product Information, Krausz, 2015, 1 page.
Smith-Blair, Clamp and Coupling Products, CC-EZW 11/13, Gen. II Maxi-Grip™ EZ®-W Restraint Couplings for Water and Industrial Service, no date given, 2 pages.
Smith-Blair, Specification Maxi-Grip® EZ-W Restraint Coupling EZWS, Apr. 27, 2018, 3 pages.

\* cited by examiner

RESTRAINED WIDE RANGE COUPLING SYSTEM

FIELD

The present inventive concept relates generally to pipe fittings and, more particularly, to a restrained coupling for joining metallic or plastic pipes in any combination.

BACKGROUND

Various types of conventional pipe couplings for coupling and sealing adjacent pipe ends of two pipe sections include a coupling sleeve or collar with each pipe end extending into a respective end of the coupling sleeve. A gasket is held adjacent to each end of the sleeve overlying the pipe section, or alternatively, along the length of the sleeve. To secure the pipe ends in place, at least one of the sleeve and the gasket(s) generally must be compressed onto the pipe ends to form a tightened or sealing engagement. The various types of pipe couplings available today include different types of clamping elements or mechanisms for producing this selective compression on the sleeve and/or the gasket(s).

Many of the conventional pipe couplings used in the field today are installed and adjusted using threaded bolts and nuts. Typically, a socket wrench or similar tool must be used to rotate the nuts to perform the installation process. However, many pipe couplings are provided with a wide range of adjustable compression that may be applied, thus, the bolts may need to be moved a significant length or distance during the tightening of the pipe coupling onto the pipe ends. In addition to requiring more time and manual labor for longer movements, specialty socket wrenches must sometimes be provided to handle the long length of movement from the starting or nominal (uncompressed) position to the fully compressed and sealed engagement position. The added complexity of parts and tools for the job may be undesirable when working in the field, such as when an installer is working in dark or poor environmental conditions on a buried pipe connection.

Furthermore, pipe outside diameters vary within their nominal size. For each nominal size, there are different outer diameters, including iron pipe size (IPS), ductile iron pipe size (DIPS), asbestos cement (AC) pipe size, and oversized cast iron pipe size. Couplings are generally built to be size specific for the specific pipe size. Thus, an installer generally must stock various couplings, spend time determining what size coupling to use and then install the coupling. It is, therefore, desirable to further improve the various types of conventional pipe couplings to reduce the time and manual labor required to install these pipe couplings and protect the integrity of the pipe.

SUMMARY

Some embodiments of the present inventive concept provide a pipe fitting including a sleeve having a generally cylindrical body portion with at least one open end configured to receive at least one pipe; a sealing gasket operatively coupled with the sleeve for engaging at least one pipe end of the at least one pipe; and a clamping element operatively coupled with the sleeve for compressing the sealing gasket into tightened engagement with the at least one of the pipe end. The clamping element further includes one or more flanges and the one or more flanges have at least one notch therein on an internal surface thereof.

In further embodiments, the one or more flanges may be coupled by one or more fastening elements. The one or more fastening elements may extend generally tangential to the generally cylindrical body portion of the sleeve and through the flanges that, when tightened, creates radially applied clamping force to tightened engagement.

In still further embodiments, the sealing gasket may include comprises a molded portion therein for receiving an armor. In certain embodiments, an armor positioned in the molded portion of the sealing gasket.

In some embodiments, the pipe fitting may further include a one-piece, near-full circumferential grip ring that engages simultaneously with the sealing gasket. The grip ring may have a plurality of teeth to grip the pipe ends. The plurality of teeth may be case-hardened to reduce occurrence of blunting. One or more teeth of the plurality of the teeth of the grip ring may be longer than remaining ones of the plurality of teeth to promote deeper grip engagement on pipes composed of harder materials. In certain embodiments, the grip ring may further include an angled surface.

In further embodiments, the one or more flanges may include a plurality of notches on an internal surfaces thereof allowing the pipe fitting to concentrically conform to a wide range of pipe diameters.

In still further embodiments, the one or more fasteners is a fastening bolt having a distinctive hexagonal head.

In some embodiments, the one or more flanges may be first and second flanges. The clamping element may further include a set of two or more small fasteners, the fastening bolt may couple the first and second flanges at a first end and the set of two or more small fasteners may couple the first and second flanges at a second end, opposite the first end. The small fasteners may be pre-tightened. The fastener may be actuated from the head of the fastening bolt. The fastening bolt may be actuated by a standard socket and/or square drive equipment.

In further embodiments, tightening the fastening bolt may provide a force required to create a seal between the sealing gasket and the at least one pipe end and engage a grip ring by bending the first and second flanges inward.

In still further embodiments, the fastening bolt may be paired with a washer and nut that are mated by shape to flange pockets allowing the first and second flanges to articulate as the fastening bolt is tightened. The washer may be a swivel washer and the nut may be a swivel nut.

Some embodiments of the present inventive concept provide a pipe fitting including a sleeve having a generally cylindrical body portion with at least one open end configured to receive at least one pipe; a sealing gasket operatively coupled with the sleeve for engaging at least one pipe end of the at least one pipe, wherein the sealing gasket comprises a molded portion therein for receiving an armor; and a clamping element operatively coupled with the sleeve for compressing the sealing gasket into tightened engagement with at least one of the pipe ends. The clamping element may further include one or more flanges coupled by one or more fastening elements.

In further embodiments, the one or more fastening elements may extend generally tangential to the generally cylindrical body portion of the sleeve and through the one or more flanges that, when tightened, creates radially applied clamping force to tightened engagement.

Still further embodiments provide a pipe fitting including a sleeve having a generally cylindrical body portion with at least one open end configured to receive at least one pipe; a sealing gasket operatively coupled with the sleeve for engaging at least one pipe end of the at least one pipe; a one-piece, near-full circumferential grip ring that engages simultaneously with the sealing gasket, the grip ring having a plurality of teeth to grip the pipe; and a clamping element operatively coupled with the sleeve for compressing the sealing gasket and grip ring into tightened engagement with at least one of the pipe ends. The clamping element further includes one or more flanges coupled by one or more fastening elements.

In some embodiments, the one or more fastening elements may extend generally tangential to the generally cylindrical body portion of the sleeve and through the flanges that, when tightened, creates radially applied clamping force to tightened engagement. The teeth may be case-hardened to reduce occurrence of blunting. One or more of the teeth of the grip ring may be longer than remaining ones of the teeth to promote deeper grip engagement on pipes composed of harder materials. The grip ring may further include an angled surface.

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, pipe outside diameters vary within their nominal size. For each nominal size, there are different outer diameters, including iron pipe size (IPS), ductile iron pipe size (DIPS), asbestos cement (AC) pipe size, and oversized cast iron pipe size. Thus, an installer generally must stock various couplings, spend time determining what size coupling to use and then install the coupling. It is, therefore, desirable to further improve the various types of conventional pipe couplings to reduce the time and manual labor required to install these pipe couplings and protect the integrity of the pipe.

In particular, a wide range capability allows for joining the same or two different-sized pipes within the same nominal size with one coupling. These couplings also have multiple bolts circumferentially around the pipe. The axial-facing bolts generally require uniform torque and are often difficult to access underneath the coupling. When these pipes are joined or repaired, axial thrust forces within the system are a concern. These forces are often mitigated with joint restraints or thrust blocks. Both joint restraints and thrust blocks work independently of the coupling. They are expensive, take time to install, and can damage the pipe. Thus, conventional restrained pipe couplings have a limited range, take a lot of time to install, and can diminish pipe integrity through point-loaded restraint mechanisms.

Accordingly, embodiments of the present inventive concept provide a restrained wide range coupling that reduces, or possibly eliminates, the added expense of thrust restraints by combining seal and restraint functions. The coupling further protects pipe integrity by distributing axial thrust forces circumferentially around the entire pipe. The coupling discussed herein has a wide range to accommodate the common nominal-size pipes with one coupling. In some embodiments, it is radially compressed with a single bolt (fastener) per pipe end, speeding up installation time. It eliminates the need for uniform compression of axial bolts, and the coupling may be oriented where the single bolt(s) can be accessed from an ergonomic position on the pipe for ease of installation. Details with respect to the restrained wide range coupling will be discussed with respect to the figures.

It will be understood that although the figures of the present application depict a bolt that is tightened by turning the bolt in a right hand configuration, embodiments of the present inventive concept are not limited thereto. Both right and left hand configurations are intended to be covered by the present disclosure.

As used herein, "fitting" refers to any type of equipment that connects two elements or parts, for example, fittings, couplings, split rings and the like. Furthermore, although the examples discussed herein refer to "pipe couplings," embodiments of the present inventive concept are not limited thereto. The fittings/couplings discussed herein can be used in combination with any equipment in need of such fittings.

Figure 1:
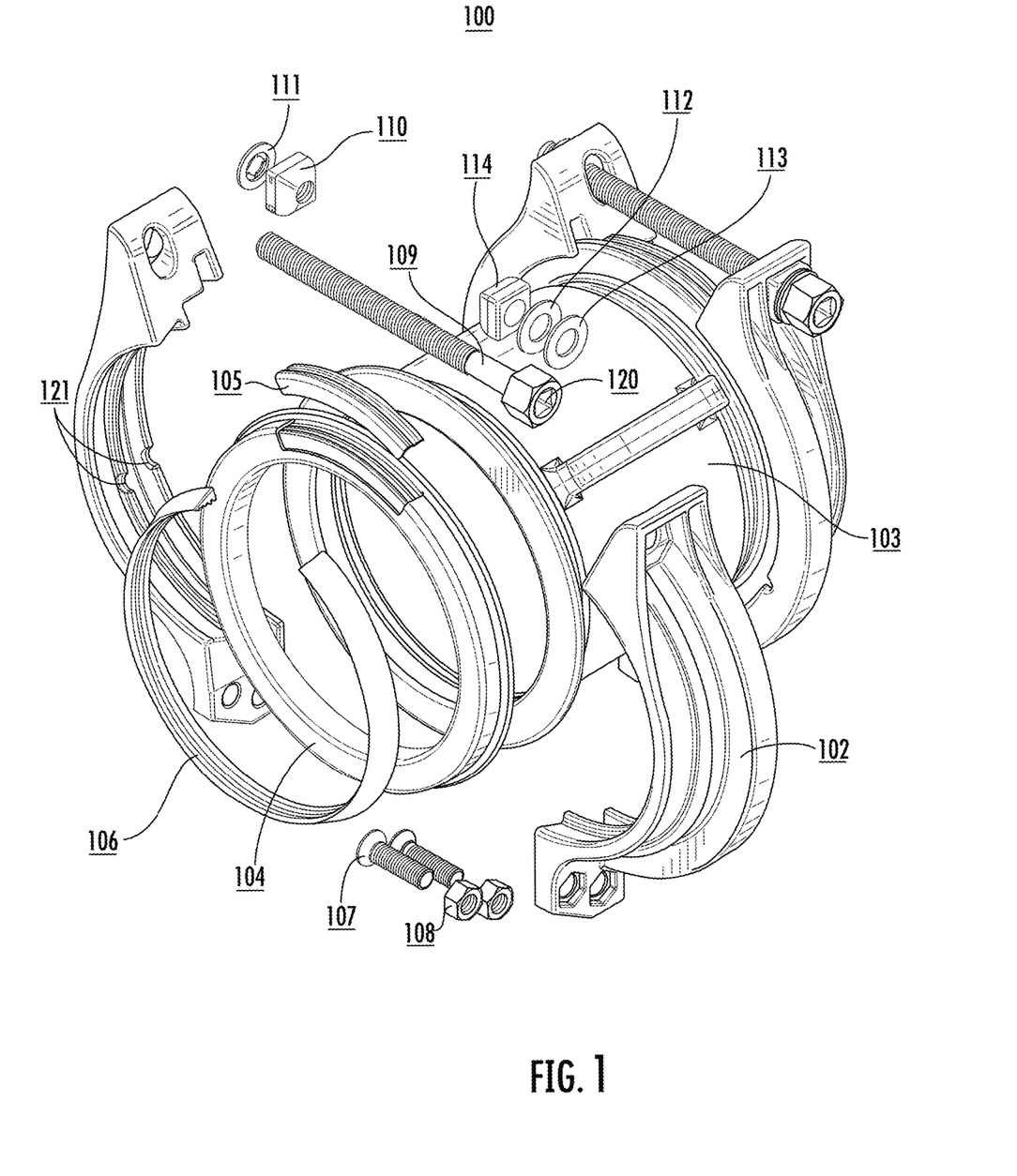
FIG. 1 is a diagram illustrating an exploded view of a pipe coupling in accordance with some embodiments of the present inventive concept.

Referring first to FIG. 1, an exploded view of a fitting/coupling 100 in accordance with some embodiments of the present inventive concept will be discussed. It will be understood that embodiments of the present inventive concept are directed to features of the coupling and the details associated therewith. Details with respect to the pipe coupling are discussed in, for example, commonly assigned U.S. Pat. Nos. 9,791,077 and 10,648,599, the disclosures of which are hereby incorporated herein by reference as set forth in their entirety. These details are provided as an example only; thus, embodiments are not limited thereto.

As illustrated in FIG. 1, the fitting/coupling 100 includes left 101 and right 102 flanges, a sleeve 103, a gasket 104 with molded in armor, armor 105, a grip ring 106, screws 107 and corresponding nuts 108, a bolt 109, a nut 110, and washer 111, and additional nut 114 and washers 112 and 113. It will be understood that the exploded view of the pipe coupling 100 in FIG. 1 is provided as an example only, embodiments of the present inventive concept are not limited thereto. The pipe coupling 100 provides context for the flanges, gasket and grip ring in accordance with embodiments discussed herein. However, the fitting/coupling 100 may be used with other elements that need to be combined without departing from the scope of the present inventive concept. It will be further understood that although FIG. 1 is shown as a system, some elements of the system may be selected and used while others are not. For example, some embodiments may include the flanges 101 and 102 and not the molded in armor 104.

In FIG. 1, the armor 105 is shown removed from the gasket 104; however, it will be understood that the armor 105 is actually molded into the gasket 104. However, embodiments of the present inventive concept are not limited thereto. For example, in some embodiments, the armor may not be molded into the gasket 104 or loose without departing from the scope of the present inventive concept.

As further illustrated in FIG. 1, the left 101 and right 102 flanges are strategically notched 121 (also shown in FIG. 3A), allowing the coupling 100 to concentrically conform to a wide range of pipe diameters. As discussed above, pipe outside diameters vary within their nominal size. For each nominal size, there are different outer diameters, including iron pipe size (IPS), ductile iron pipe size (DIPS), Asbestos Cement (AC) pipe size, oversized cast iron pipe size, and the like. Thus, having a coupling 100 that conforms to different pipe diameters allows for more versatility. In some embodiments, a single actuation point on each end compresses the gasket 104 and grip ring 106 simultaneously, reducing installation time.

Figure 3A:
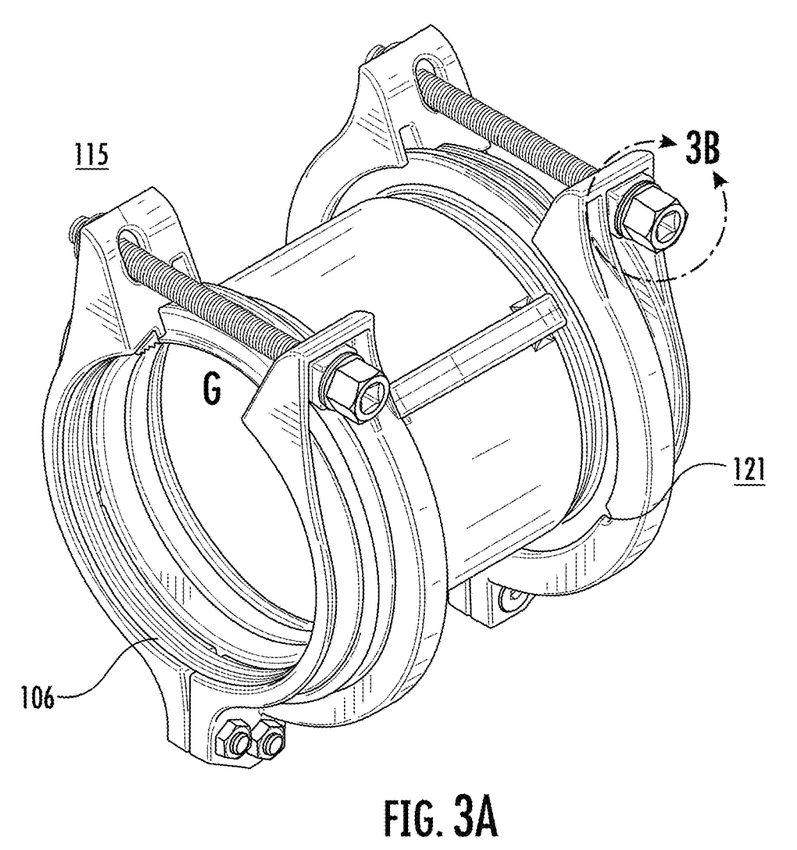
FIG. 3A is a perspective view of a fully assembled pipe coupling in accordance with some embodiments of the present inventive concept.
Figure 4:
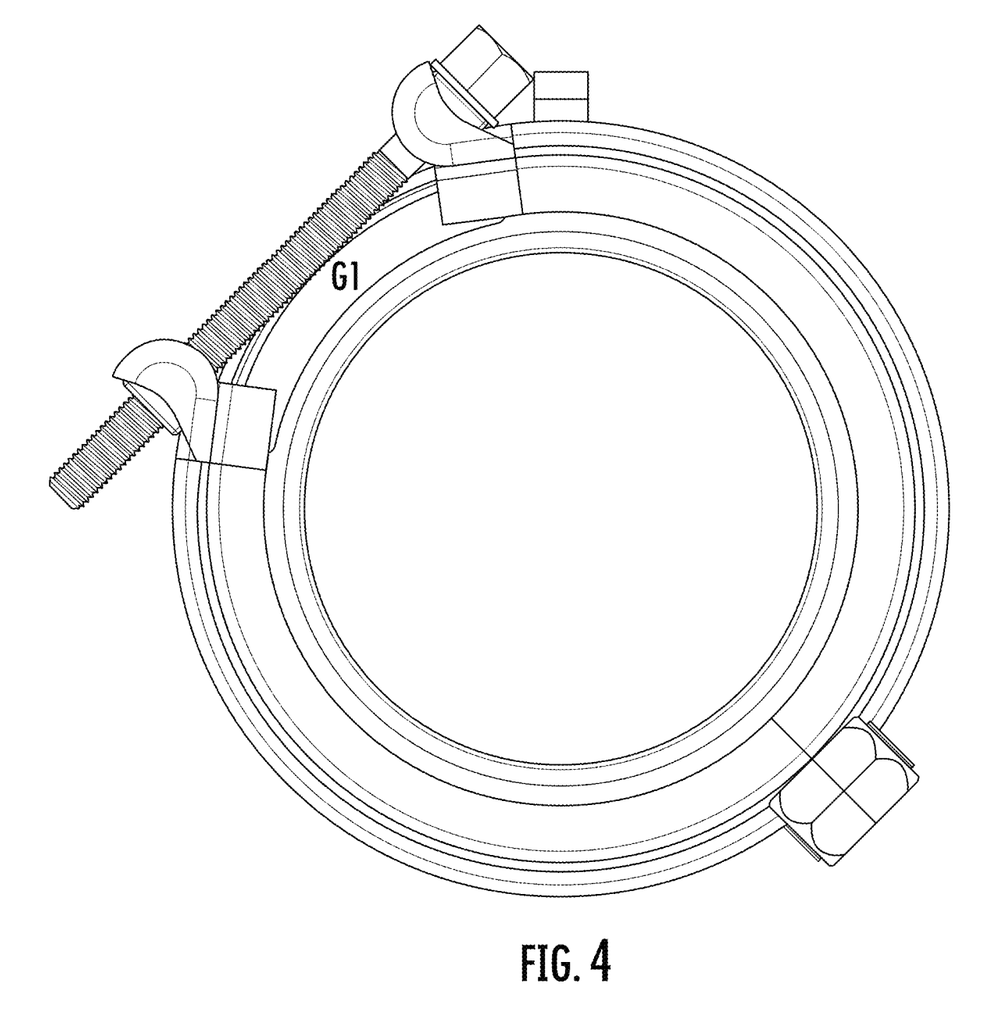
FIG. 4 is a front view of the pipe coupling including the fastener having a first width (uncompressed) between the flanges in accordance with some embodiment of the present inventive concept.
Figure 5:
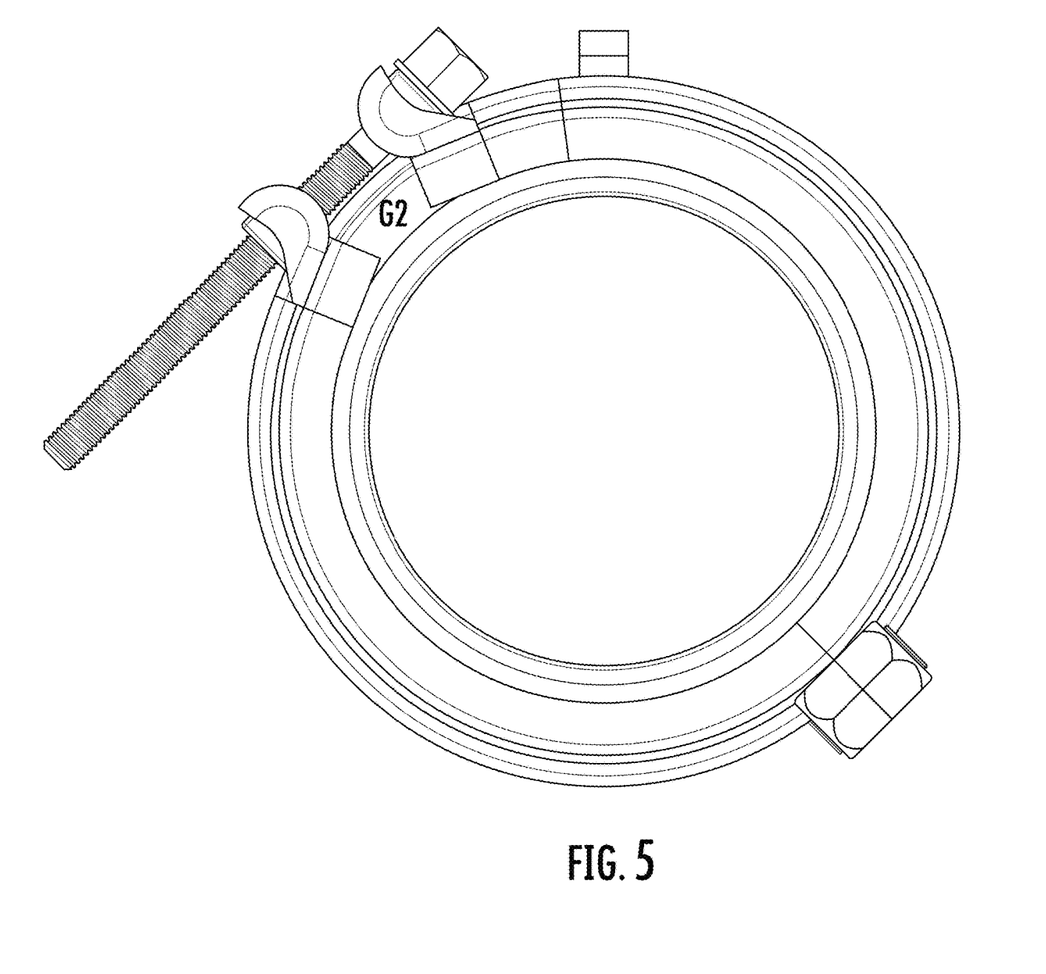
FIG. 5 is a front view of the pipe coupling including the fastener having a second, different width (compressed) between the flanges in accordance with some embodiment of the present inventive concept.

The grip ring 106, as shown, is a continuous member that is split axially and allows full load distribution and increased pipe engagement. In other words, the grip ring 106 is almost a complete circle, but the ends are not attached. In some embodiments, it is attempted to get the flanges 101 and 102 and, thus, the grip ring 106, to come as close to 360 degrees as possible. As illustrated in FIG. 3A, when fully assembled there is a gap G between the ends of the flanges 101 and 102. FIGS. 4 and 5 show two different widths G1 and G2, respectively, of the gap, however, embodiments of the present inventive concept are not limited thereto. In particular, the first width G1 is uncompressed. This width is representative of when the pipe coupling is initially assembled and in a relaxed state. The second width G2 is representative of the pipe coupling in a compressed state, thus G2 is smaller than G1. Any width may be accommodated without departing from the scope of the present inventive concept. Although the grip ring 106 is shown in FIG. 1 as a continuous member that is split axially, some embodiments include a grip ring that is fully contiguous or in multiple pieces without departing from the scope of the present inventive concept.

Referring again to FIG. 1, the internal surface of the end flange 101/102 has one or more notches 121 that promote uniform bending of the flange 101/102 when it is actuated at a single point, for example, with the bolt 109. This bending results in a uniform radial compression that allows the gasket 104 and grip ring 106 to come into contact with the pipe when installed. As discussed, the grip ring 106 is split axially, which increases the likelihood that the load is distributed evenly around the pipe, rather than being concentrated at a single point.

The internal pipe pressure creates axial thrust forces pulling the pipe ends away from the coupling, while the grip ring(s) 106 remain engaged with the pipe(s). The end flange profile is angled (251—FIG. 2C) parallel to the grip ring's 106 outer surface, which further wedges the grip ring 106 into contact with the pipe circumferentially. This pressure-assisted gripping feature increases the likelihood that the pipe is engaged uniformly, which helps to restrain axial loads.

In some embodiments, the left 101 and right 102 flange halves may be cast from ductile iron. The flanges 101 and 102 may be cast with a profile that provides form and support to the sealing component 104 and the grip ring 106 and maintains rigidity against axial pipe forces. Strategically placed notches 121 in the left and right flange halves promote uniform bending of these components as the large fastener 109 is tightened. This controlled bending provides evenly distributed compression of the elastomeric sealing component and contact pressure at the teeth (FIG. 2C) of the grip ring.

Figure 2A:
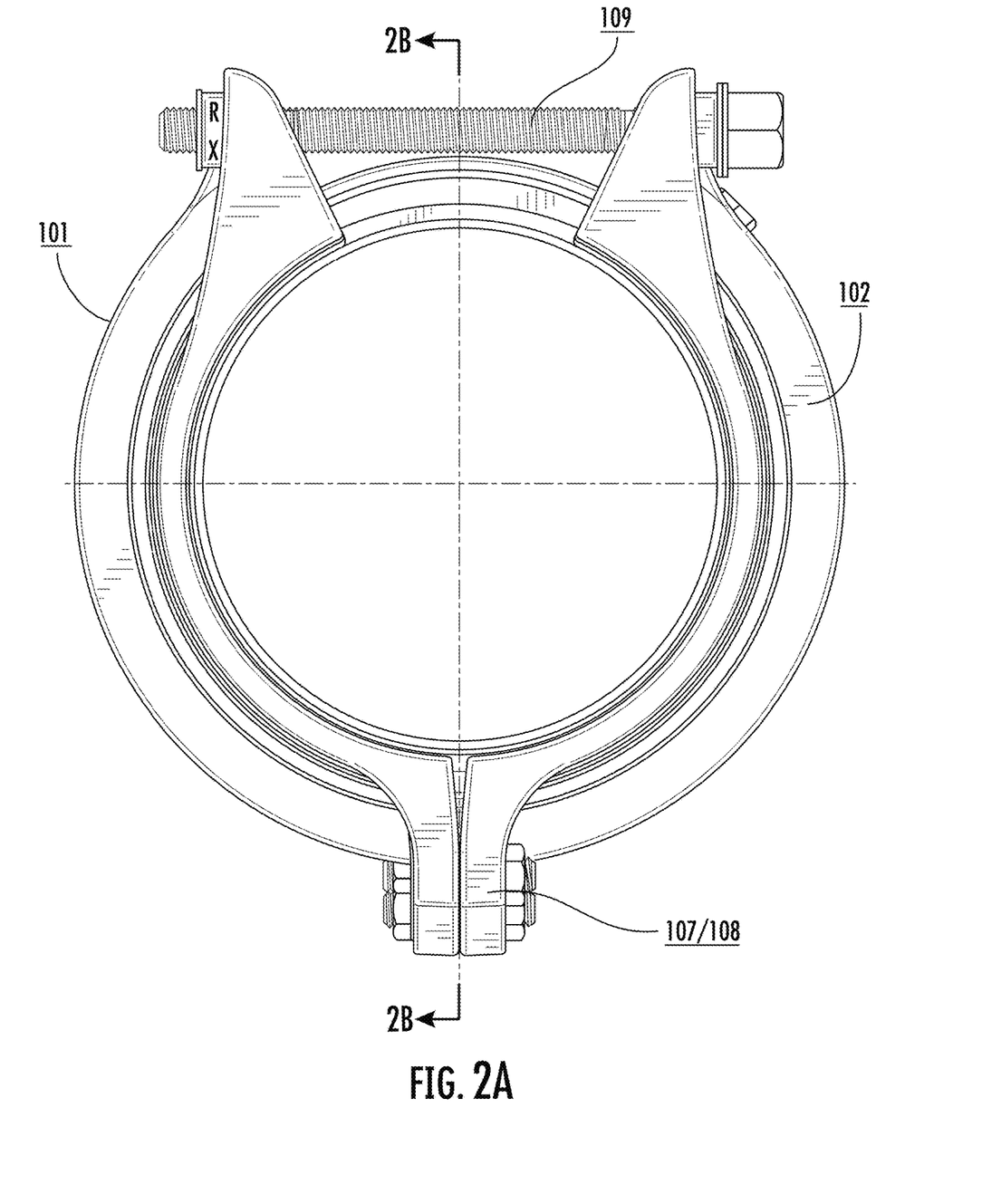
FIG. 2A is a front view of the pipe coupling in accordance with some embodiments of the present inventive concept.
Figure 2B:
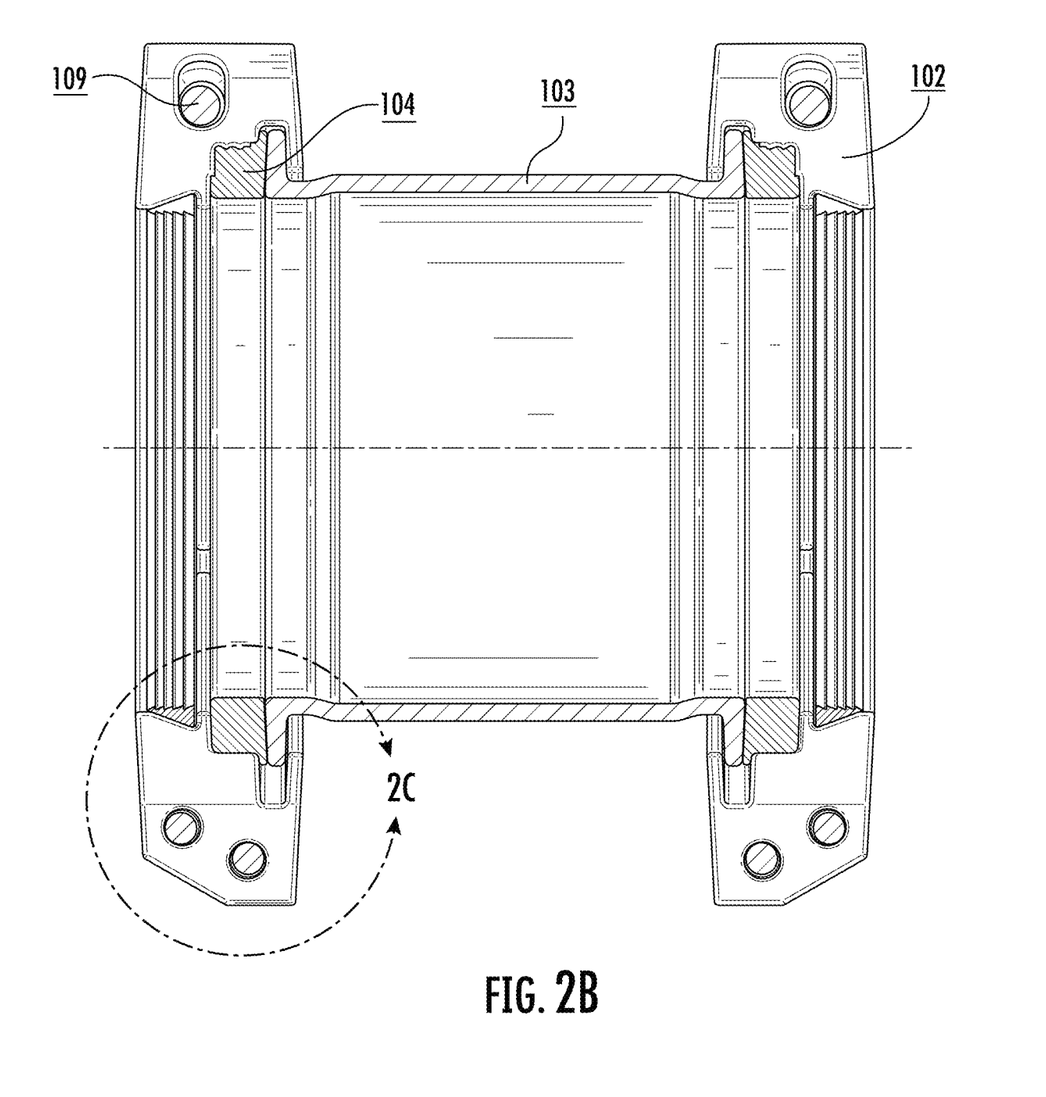
FIG. 2B is a section view of the pipe coupling on the line A-A of FIG. 2A in accordance with some embodiments of the present inventive concept.
Figure 2C:
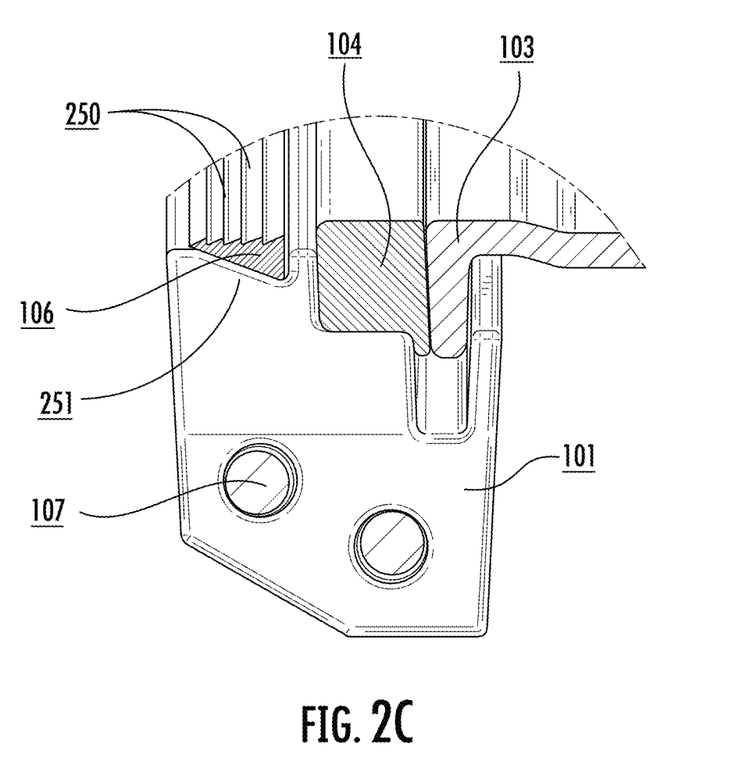
FIG. 2C is a detail section view of the pipe coupling of Section B of FIG. 2B at an interface between the flanges in accordance with some embodiments of the present inventive concept.

Referring now to FIGS. 2A through 2C, various details of the system will be discussed. FIG. 2A is a front view of the pipe coupling in accordance with some embodiments of the present inventive concept. FIG. 2B is a section view of the pipe coupling on the line A-A of FIG. 2A in accordance with some embodiments of the present inventive concept. FIG. 2C is a detail section view of the pipe coupling of Section B of FIG. 2B at an interface between the flanges in accordance with some embodiments of the present inventive concept. As illustrated in FIG. 2C, the one-piece, near-full circumferential (near 360 degree) grip ring 106 utilizes "teeth" 250 to grip the pipe ends. The teeth 250 are case-hardened to reduce the likelihood of blunting. The profile illustrated in FIG. 2C consists of five teeth, with two being slightly longer. The two longer teeth promote deeper grip engagement on pipes composed of harder materials. The grip ring 106 further includes an angled surface 251 (FIG. 2C) to obtain "pullout assist." As axial pipe forces increase, the grip ring's angled outer surface provides a localized increase in contact surface pressure on the grip ring teeth. The grip ring may be coated with a thin shop coat primer in some embodiments.

The molded-in armor 105 on the gasket 104 makes assembly easier and increases the likelihood of uniform compression on an outer diameter of the gasket 104, resulting in minimal high and low-pressure fluctuation contact areas with the sealing face of the sleeve 103.

In particular, wherever there is a high/low pressure fluctuation there is an increased chance of leaks. Thus, providing more uniform compression decreases the chances of potential leaks.

In some embodiments, the elastomeric sealing component (gasket 104) is constructed with a molded-in ¼ hard 304 stainless steel bridge plate or "armor" 105. The armor 105 bridges the gap between the flanges 101/102 when fully assembled. This armor 105 is formed with surface features to reduce friction between contact surfaces. The armor 105 assists in providing uniform compression on the sealing component 104 within the space between the flange halves 101 and 102. The molded-in feature reduces the likelihood of unwanted movement between the sealing component 104 and the armor 105.

Referring to FIGS. 1 and 2A, the fasteners may include a set of two or more small fasteners 107 and 108 at the union of the left 101 and right 102 flange halves as well as a large tightening fastener 109 opposite of the small fasteners. In some embodiments, the small fasteners 107 and 108 may be composed of 304 stainless steel and are used to assemble the coupling during manufacturing. In some embodiments, the small fasteners are pre-tightened. The large fastener 109 may also include 304 stainless steel in some embodiments, and the threads may be coated with a molybdenum slip coating to reduce friction. Tightening the fastener 109 provides the force required to create a seal between the sealing component 104 and pipe and engage the grip ring 106 by bending the flange halves 101 and 102 inward to the pipe(s) being coupled. The fastener 109 is paired with a washer 111 and nut 110 that are mated by shape to their flange "pockets", allowing the left 101 and right 102 flange halves to articulate or swivel as the large fastener 109 is tightened. In some embodiments the washer 111 and nut 110 may be a swivel washer and swivel nut, respectively, however, embodiments of the present inventive concept are not limited thereto.

Figure 3B:
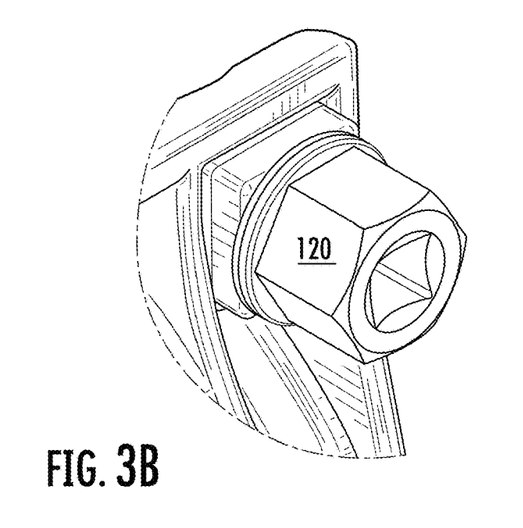
FIG. 3B is a detailed view of a bolt head of the fastener connecting the flanges in accordance with some embodiment of the present inventive concept.

In some embodiments, the design of the fastener head allows for two methods of installation. The distinctive hexagonal head of the bolt 120 illustrated in FIG. 1 may be sized for a standard depth 1 1/16" socket. Tightening at the head does not require a deep or extra-deep socket as with conventional fasteners. The distinctive hexagonal bolt head 120 has a custom head height that provides more than adequate engagement with the socket to prevent unwanted bolt head rounding and slipping while tightening. In some embodiments, the bolt head features an additional standard square drive 122 (shown in FIG. 3B) to allow for tightening without a 1 1/16" socket. Thus, the fastener 109 may be tightened using a standard depth socket or other tools without departing from the scope of the present inventive concept.

In some embodiments, the coupling/fitting 100 may accept pipe outside diameters that fall within a wide range. The coupling may be, for example, a "stab-fit," installation-ready coupling of the "wide range" classification of restrained couplings because its range encompasses 6-inch IPS, DIP, and cl A, B, C, & D cast pipe sizes, and the coupling 100 is installed without any disassembly/assembly.

Furthermore, in some embodiments the coupling 100 may be suitable for coupling pipe of, for example, the following materials in any combination within the acceptable range: ductile iron, grey iron, polyvinyl chloride, carbon steel, and polyethylene.

Figure 6:
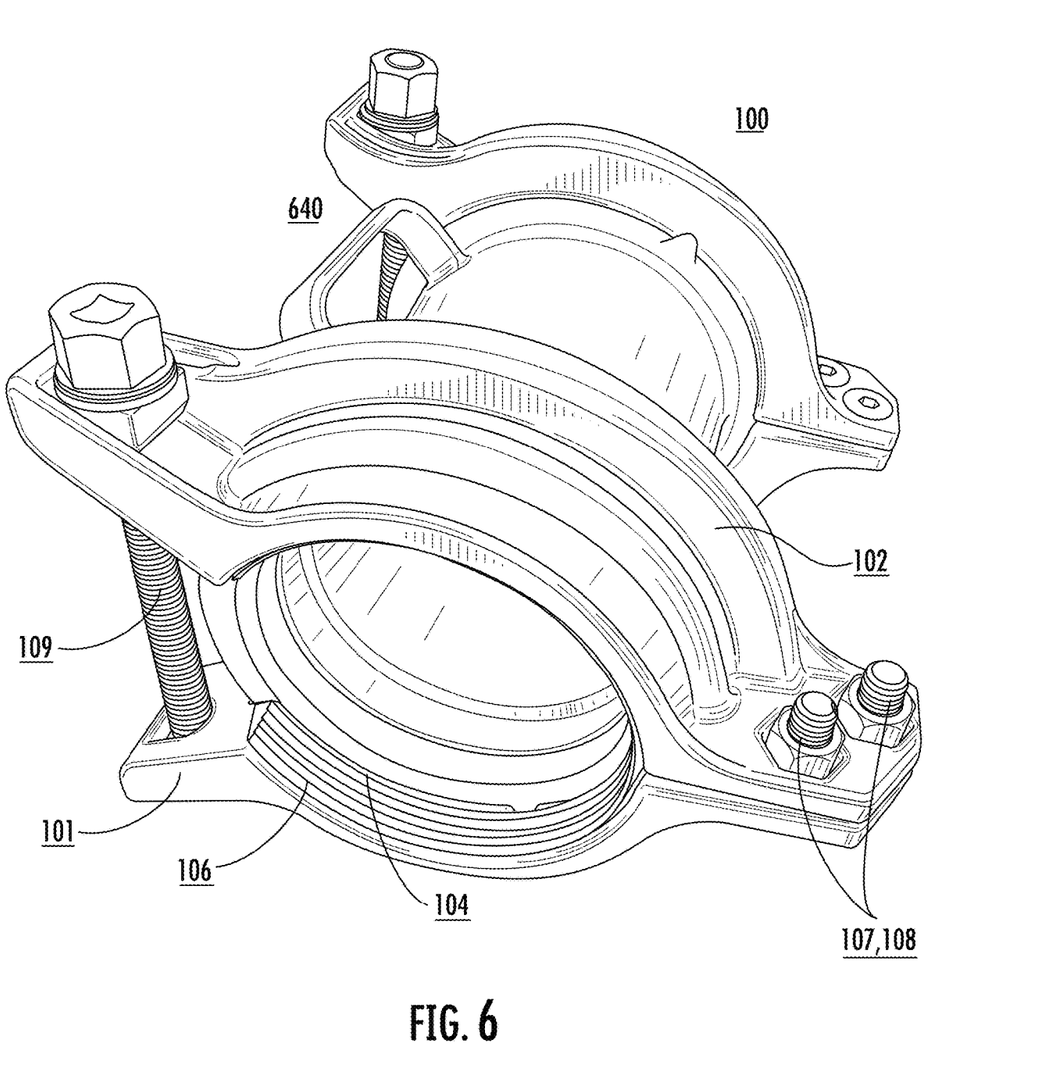
FIG. 6 is a picture illustrating an example pipe coupling in accordance with some embodiments of the present inventive concept.

Referring now to FIG. 6, in some embodiments, the coupling 100 consists of a cast ductile iron, sleeve with a lifting handle 640 to aid installation and two pipe-to-coupling interfaces. Each pipe-to-coupling interface may utilize an elastomeric sealing component gasket 104, a one-piece, near-full circumferential grip ring 106, fasteners 107, 108 and 109 for assembling and tightening the coupling, and cast ductile iron, left and right flange halves 101 and 102.

It will be understood that the coupling 100 discussed herein may be applied to different size pipes without departing from the scope of the present inventive concept. For example, the coupling 100 may be used in conjunction with 2, 3, 4, 6, 8, 10, 12 and 16 inch pipes.

As discussed briefly above, the coupling in accordance with embodiments discussed herein simplifies installation with single-point activation on each end, protects pipe integrity, and resists axial forces while offering rangeability. The advantages of the coupling include full circumferential load distribution, pressure-assisted activation of the grip ring, and strategically placed flange notches to promote uniform compression.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A pipe fitting, comprising:
   a sleeve having a generally cylindrical body portion with at least one open end configured to receive at least one pipe;
   a sealing gasket operatively coupled with the sleeve for engaging at least one pipe end of the at least one pipe; and
   a clamping element operatively coupled with the sleeve for compressing the sealing gasket into tightened engagement with the at least one of the pipe end, the clamping element further including one or more flanges, the one or more flanges having at least one notch therein on an internal surface thereof, wherein the sealing gasket comprises a molded armor portion therein.

2. The pipe fitting of claim 1, wherein the one or more flanges being coupled by one or more fastening elements, wherein the one or more fastening elements extend generally tangential to the generally cylindrical body portion of the sleeve and through the flanges that, when tightened, creates radially applied clamping force to tightened engagement.

3. The pipe fitting of claim 2, wherein the one or more fasteners is a fastening bolt having a distinctive hexagonal head.

4. The pipe fitting of claim 3, wherein the one or more flanges comprise first and second flanges, wherein the clamping element further comprises a set of two or more small fasteners, wherein the fastening bolt couples the first and second flanges at a first end and the set of two or more small fasteners couple the first and second flanges at a second end, opposite the first end.

5. The pipe fitting of claim 4, wherein tightening the fastening bolt provides a force required to create a seal between the sealing gasket and the at least one pipe end and engage a grip ring by bending the first and second flanges inward.

6. The pipe fitting of claim 4, wherein the fastening bolt is paired with a washer and nut that are mated by shape to flange pockets allowing the first and second flanges to articulate as the fastening bolt is tightened.

7. The pipe fitting of claim 6, wherein the washer is a swivel washer and the nut is a swivel nut.

8. The pipe fitting of claim 4, wherein the small fasteners are pre-tightened.

9. The pipe fitting of claim 3, wherein the fastener is actuated from the head of the fastening bolt.

10. The pipe fitting of claim 9, wherein the fastening bolt is actuated by a standard socket and/or square drive equipment.

11. The pipe fitting of claim 1, further comprising a one-piece, near-full circumferential grip ring that is split axially that engages simultaneously with the sealing gasket, the grip ring having a plurality of teeth to grip the pipe ends.

12. The pipe fitting of claim 11, wherein the plurality of teeth are case-hardened to reduce occurrence of blunting.

13. The pipe fitting of claim 11, wherein one or more teeth of the plurality of the teeth of the grip ring are longer than remaining ones of the plurality of teeth to promote deeper grip engagement on pipes composed of harder materials.

14. The pipe fitting of claim 11, wherein the grip ring further includes an angled surface.

15. The pipe fitting of claim 1, wherein the one or more flanges comprise a plurality of notches on an internal surfaces thereof allowing the pipe fitting to concentrically conform to a wide range of pipe diameters.

16. A pipe fitting, comprising:
a sleeve having a generally cylindrical body portion with at least one open end configured to receive at least one pipe;
a sealing gasket operatively coupled with the sleeve for engaging at least one pipe end of the at least one pipe; and
a clamping element operatively coupled with the sleeve for compressing the sealing gasket into tightened engagement with the at least one of the pipe end, the clamping element further including one or more flanges, the one or more flanges having at least one notch therein on an internal surface thereof, wherein the sealing gasket comprises a molded portion therein for receiving an armor; and
wherein the one or more flanges being coupled by one or more fastening elements, wherein the one or more fastening elements extend generally tangential to the generally cylindrical body portion of the sleeve and through the flanges that, when tightened, creates radially applied clamping force to tightened engagement.

17. The pipe fitting of claim 16, further comprising an armor positioned in the molded portion of the sealing gasket.

18. A pipe fitting comprising:
a sleeve having a generally cylindrical body portion with at least one open end configured to receive at least one pipe;
a sealing gasket operatively coupled with the sleeve for engaging at least one pipe end of the at least one pipe, wherein the sealing gasket comprises a molded armor portion therein; and
a clamping element operatively coupled with the sleeve for compressing the sealing gasket into tightened engagement with at least one of the pipe ends, the clamping element further including one or more flanges coupled by one or more fastening elements.

19. The pipe fitting of claim 18, wherein the one or more fastening elements extend generally tangential to the generally cylindrical body portion of the sleeve and through the one or more flanges that, when tightened, creates radially applied clamping force to tightened engagement.

20. A pipe fitting comprising:
a sleeve having a generally cylindrical body portion with at least one open end configured to receive at least one pipe;
a sealing gasket operatively coupled with the sleeve for engaging at least one pipe end of the at least one pipe;
a one-piece, near-full circumferential grip ring that is split axially to form a gap between ends thereof and that engages simultaneously with the sealing gasket, the grip ring having a plurality of teeth to grip the pipe; and
a clamping element operatively coupled with the sleeve for compressing the sealing gasket and grip ring into tightened engagement with at least one of the pipe ends, the clamping element further including one or more flanges coupled by one or more fastening elements.

21. The pipe fitting of claim 20:
wherein the one or more fastening elements extend generally tangential to the generally cylindrical body portion of the sleeve and through the flanges that, when tightened, creates radially applied clamping force to tightened engagement;
wherein the teeth are case-hardened to reduce occurrence of blunting;
wherein one or more of the teeth of the grip ring are longer than remaining ones of the teeth to promote deeper grip engagement on pipes composed of harder materials; and
wherein the grip ring further includes an angled surface.

* * * * *